G. W. SCHWOOB.
MOTOR VEHICLE.
APPLICATION FILED APR. 18, 1913.
1,123,400.
Patented Jan. 5, 1915.
3 SHEETS—SHEET 2.
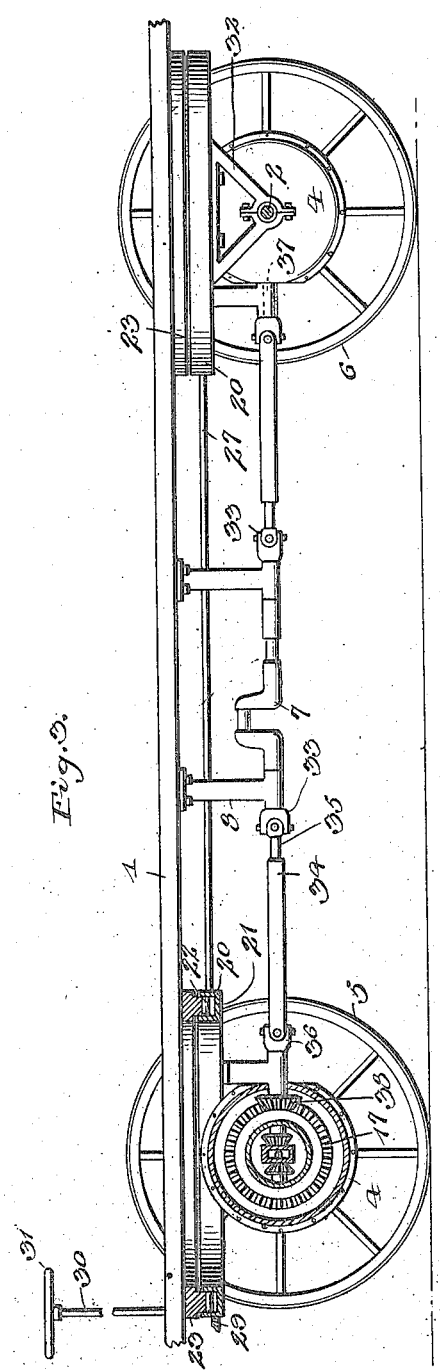
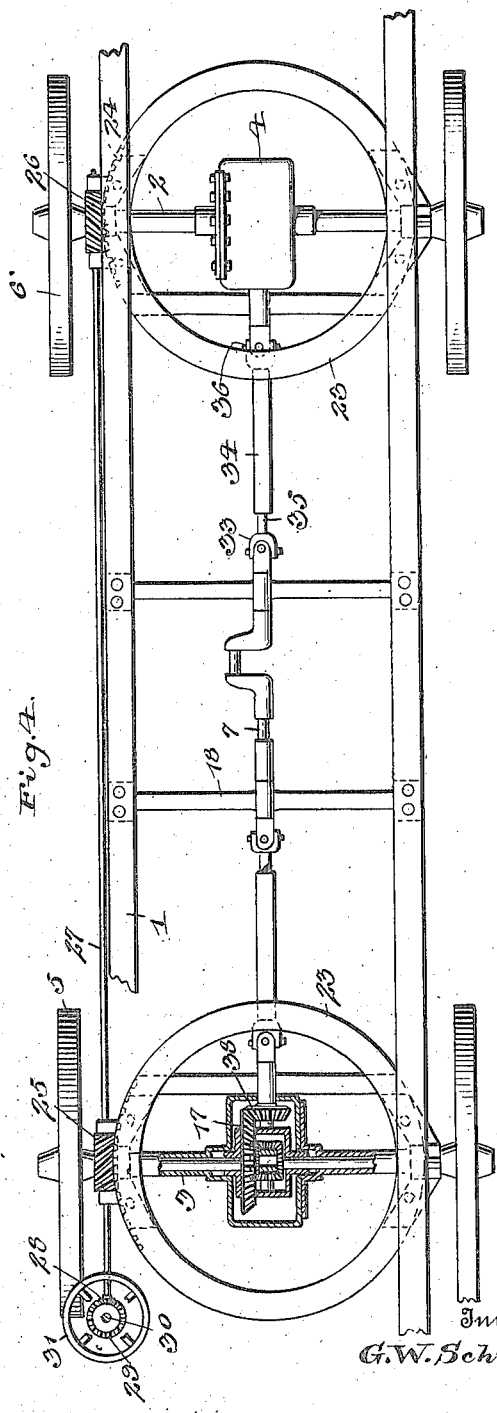
Witnesses
Inventor
G. W. Schwoob,
By Victor J. Evans
Attorney

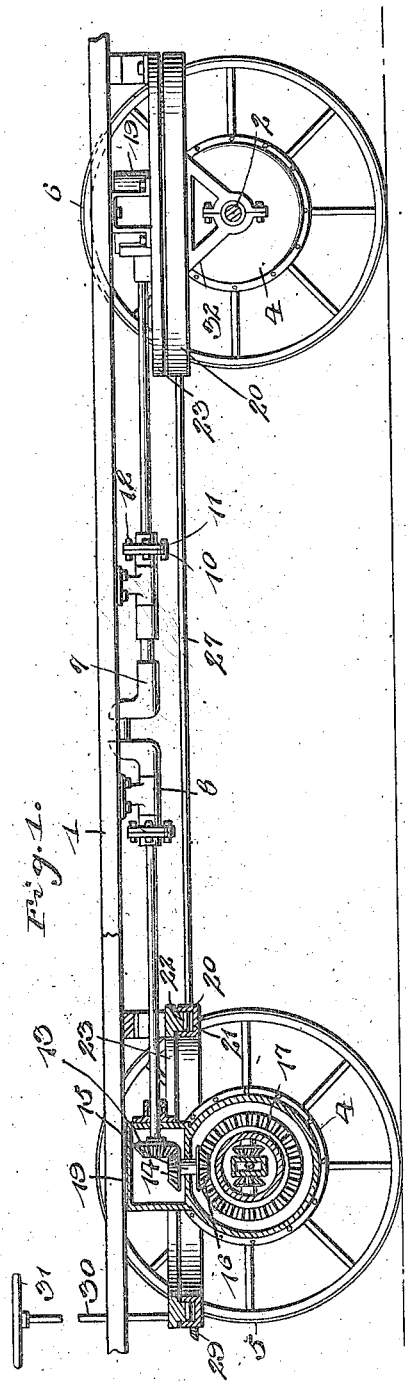

UNITED STATES PATENT OFFICE.

GEORGE W. SCHWOOB, OF CODY, WYOMING.

MOTOR-VEHICLE.

1,123,400.  Specification of Letters Patent. Patented Jan. 5, 1915.

Application filed April 18, 1913. Serial No. 762,112.

*To all whom it may concern:*

Be it known that I, GEORGE W. SCHWOOB, a citizen of the United States, residing at Cody, in the county of Park and State of Wyoming, have invented new and useful Improvements in Motor-Vehicles, of which the following is a specification.

This invention relates to motor vehicles, the object in view being to provide a four-wheel transmission and steering gear for vehicles of the class described, by means of which both the front and rear axles and the wheels carried thereby may be simultaneously driven at equal speeds, and the axles turned simultaneously in opposite directions for steering the machine in a curved path, either to one side or the other.

A further object of the invention is to provide a construction of the character above referred to, embodying the use of duplicate and interchangeable parts, so that the parts may be readily replaced; the construction referred to also economizing materially in the cost of construction and repair of the machine as a whole.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation, partly in section, of a motor vehicle embodying the present invention. Fig. 2 is a plan view of the truck, showing the gear cases in section. Fig. 3 is a side elevation, partly in section, of a truck showing a modified arrangement of driving gear. Fig. 4 is a plan view of the same, partly in section.

Referring to the drawings, 1 designates the parallel side bars constituting part of the machine frame, under which are arranged the front and rear driving axles 2 and 3, respectively. Each of said axles is centrally divided and equipped with differential gears such as are now in common use in automobile construction, each differential gear as a whole being contained in a suitable gear case 4. The rear wheels 5 and the front wheels 6 are fast on their respective axle sections and are consequently driven thereby at a speed governed by the differential gears.

7 designates the crank shaft of the motor which has its end portions extended and mounted in bearing hangers 8 secured to the machine frame, as shown in Fig. 1. Connected to the opposite ends of the crank shaft 7 are the fore and aft sections 9 of a drive shaft, the sections 9 being coupled to the ends of the crank shaft by means of flanged couplings 10 and 11 fast, respectively, on the adjacent ends of each shaft section 9 and the end of the crank shaft, the flanges being bolted together, as shown at 12.

Each drive shaft section 9 is provided at its outer extremity with a bevel pinion 13 which meshes with and drives another pinion 14 on a short vertical shaft 15. On this same shaft 15 is another bevel pinion 16 which meshes directly with the master gear wheel 17 of one of the differential gears, as clearly indicated in Fig. 1. The shaft 15 is located exactly above and in line with the center of pivotal movement of the adjacent axle, so that the gears referred to remain in constant mesh, irrespective of the degree to which the axle is turned for the purpose of steering the machine.

The drive shaft sections 9 are of equal length, the motor (not shown) being supported by the frame 1, at a central point, and, therefore, said shaft sections are interchangeable and each the duplicate of the other. In Fig. 2, 18 designates the motor bearers or cross bars which are connected at their opposite ends to the side bars 1 of the frame, the shaft hangers 8 being located directly under the engine bearers, as shown in Fig. 1. In order to exclude dust, dirt and other foreign matter from the gears 13 and 14, gear cases 19 are fitted around the same, as shown in Fig. 1.

Mounted on each of the axles 2 and 3 are annular bolsters 20 channeled, as shown at 21, and having a circular series of anti-friction rollers 22 journaled in said channel, so as to receive and support a bearing ring 23 which is secured to the under side of the machine frame, as indicated in the drawings, the shaft sections 9 passing over the bearing rings 23 and being geared to the differential gear in the manner above described. This permits the front and rear axles to turn on vertical axes for the purpose of steering the machine.

At one side, each of the annular bolsters 20 is provided with worm teeth 24 which are engaged by right and left hand worm gears 25 and 26 fast on a worm shaft 27 mounted in suitable bearings at one side of the machine frame, the shaft 27 being provided at one end with a pinion 28 which meshes with a bevel gear wheel 29 on an upstanding pilot wheel shaft 30, to which the usual hand steering or pilot wheel 31 is secured. In this manner, by means of the pilot wheel 31, the shaft 27 may be turned, and as the worm gears 25 and 26 are respectively right and left hand gears, the annular bolsters 20 will be simultaneously moved in opposite directions, thereby imparting a corresponding movement to the front and rear axles on their vertical axes. 32 designates supports extending downwardly from the bolsters 20 and embracing the front and rear axles 2 and 3.

In Figs. 3 and 4, the crank shaft 7 is provided at its opposite ends with universal joints 33 having connected therewith longitudinally extensible drive shaft sections, each comprising an outer tubular member 34 and the inner telescopic member 35. At its outer end, each of said extensible shaft sections is connected by a universal joint 36 to a short shaft 37 having on its extremity a bevel pinion 38 which meshes directly with the master wheel 17 of the adjacent differential gear. The construction just referred to dispenses with the gears 14 and 16, and the short vertical shaft 15 shown and described in connection with Figs. 1 and 2, while the universal joints 33 and 36 in connection with the telescopic drive shaft sections admit of the turning of the front and rear axles as well as the necessary up and down relative movement between the frame and axles in case the frame is supported by springs, in accordance with the usual automobile and motor truck practice.

Under both constructions and arrangements hereinabove particularly set forth, it will be seen that the engine is mounted in the center of the machine frame and connected by drive shaft sections to the front and rear axles through the differential gears shown and described, thereby permitting the power of the crank shaft of the engine to be imparted simultaneously to both axles, obtaining a four-wheel drive for the vehicle. The jointed and telescopic construction of the drive shaft illustrated in Figs. 3 and 4 admits of the necessary flexibility in the running gear of the vehicle to provide for the steering movements of the axles, and the relative up and down movements between the frame or chassis of the vehicle and the axles on which said frame is carried.

The truck hereinabove particularly described is adapted to have any desired form of body mounted thereon, in accordance with the use to which the completed machine is to be put.

What is claimed is:

In a motor vehicle, a truck frame, front and rear axles supporting the frame and mounted to turn on vertical axes, steering mechanism for simultaneously turning said axles in opposite directions, and driving mechanism comprising a motor crank shaft supported on the frame midway between the axles and below the truck frame, duplicate sets of differential gearing on said axles, fore and aft drive shaft sections coupled to and actuated by the motor shaft, and vertical shafts located in the center of movement of said axles and geared to said drive shaft sections and to the master wheels of the sets of differential gearing.

In testimony whereof I affix my signature in presence of two witnesses.

GEORGE W. SCHWOOB.

Witnesses:
F. F. McGEE,
C. L. BRADY.